United States Patent
Takagi et al.

(10) Patent No.: US 6,872,166 B2
(45) Date of Patent: Mar. 29, 2005

(54) AUTOMATIC TRANSMISSION SYSTEM AND METHOD FOR CONTROLLING THEREBY

(75) Inventors: Kiyoharu Takagi, Okazaki (JP); Masato Shimei, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/400,790

(22) Filed: Mar. 28, 2003

(65) Prior Publication Data

US 2003/0216218 A1 Nov. 20, 2003

(30) Foreign Application Priority Data

Mar. 28, 2002 (JP) ........................................ 2002-091892

(51) Int. Cl.[7] .......................... F16H 61/00; F16H 62/26
(52) U.S. Cl. ........................................ 477/117; 477/156
(58) Field of Search .............................. 477/117, 121, 477/156; 701/58–59

(56) References Cited

U.S. PATENT DOCUMENTS

| | | | | |
|---|---|---|---|---|
| 5,813,943 A | | 9/1998 | Kousaka et al. | |
| 5,846,163 A | * | 12/1998 | Kimura et al. | 477/148 |
| 5,848,951 A | * | 12/1998 | Lee | 477/133 |
| 5,911,647 A | * | 6/1999 | Kozaki et al. | 477/143 |
| 6,102,830 A | * | 8/2000 | Tsutsui et al. | 477/143 |

FOREIGN PATENT DOCUMENTS

| | | | | |
|---|---|---|---|---|
| JP | 07-272212 A | | 1/1995 | |
| JP | 11/48553 A | * | 6/1999 | .......... F16H/61/06 |

* cited by examiner

*Primary Examiner*—Tisha D. Lewis
(74) *Attorney, Agent, or Firm*—Burns, Doane, Swecker & Mathis, L.L.P.

(57) ABSTRACT

An automatic transmission system for a vehicle includes a rotational speed detector for detecting a variation of a rotation number of driving torque transmitting member when a friction engagement element, which has been disengaged based upon oil pressure controlled by a control unit, a side of which has been transmitted with the rotation of the driving torque transmitting member, and the other side of which is locked not to be rotated during the vehicle at a stationary condition, is controlled to be engaged, wherein an oil pressure characteristic value of the friction engagement element is learned by the control unit based upon the variation of the rotation number of the driving torque transmitting member when the friction engagement element is initially engaged.

20 Claims, 3 Drawing Sheets

AUTOMATIC TRANSMISSION SYSTEM AND METHOD FOR CONTROLLING THEREBY

CROSS REFERENCE TO RELATED APPLICATIONS

This application is based on and claims priority under 35 U.S.C. §119 with respect to a Japanese Patent Application 2002-091892, filed on Mar. 28, 2002, the entire content of which is incorporated herein by reference.

FIELD OF THE INVENTION

This invention relates to an automatic transmission system. More particularly, relating for determining an oil pressure characteristic value and a method for determining an oil pressure characteristic value by the automatic transmission system.

BACKGROUND OF THE INVENTION

According to a conventional automatic transmission housing friction engagement elements such as a friction clutch and a friction brake, the friction engagement elements are hydraulically controlled so as to be engaged or disengaged by use of an accumulator and an orifice. However, somewhat recent developments have led to an automatic transmission in which an oil pressure from an oil pressure source is directly controlled by use of a solenoid valve, thereby capable of controlling the oil pressure to be supplied to each friction engagement element without the use of the accumulator and so on. In such a case, a smooth and highly responsive shift operation can be performed in the automatic transmission and a driver can feel a comfortable shift feeling.

In the above-described direct control of the oil pressure to be supplied to each friction engagement element, meanwhile, the oil pressure control of the friction engagement element, i.e. a control of a piston stroke is still demanded to be performed with an improved response at the start of engaging the friction engagement element. Generally speaking, the friction engagement element is filled in with oil at a rapid speed corresponding to increase of the oil introduced thereto at the start of the engaging operation. This type of oil pressure control is so-called pre-charge control. In this case, the piston disposed in the friction engagement element can be hereby moved with the aid of the oil pressure of the oil rapidly filling the friction engagement element, so that the control of the piston stroke can be effectively prevented from being delayed.

The oil introduced into the friction engagement element is then reduced after the pre-charge control and the oil pressure therein is maintained at a relatively low oil pressure (i.e. a standby pressure), which approximately corresponds to a biasing force of a return spring disposed in the friction engagement element, for a predetermined time. Accordingly, surge pressure can be prevented from being generated at a piston stroke end.

An oil pressure characteristic value upon the pre-charge control sometimes may fluctuate due to an individual difference of an automatic transmission, an engine, or the like. In order to solve the aforementioned problem, an oil pressure control device disclosed in a Japanese Patent Laid-Open published as No. 07(1995)-27212 calculates an oil pressure control amount based upon a data base (a map) established by an experiment and the like.

The piston stroke control can be optimized in a short or long term by learning the piston stroke. According to a control system for an automatic transmission disclosed in a U.S. Patent as U.S. Pat. No. 5,813,943, a biasing force of a return spring disposed in a clutch C1 (a start clutch), i.e. a standby pressure can be estimated by optimally performing a neutral control in the automatic transmission.

When the automatic transmission, an engine, an electronic control unit, and the solenoid valve (an oil pressure control unit) have been mounted on a vehicle at a delivery initial condition, it may be difficult to comprehend an entire individual difference so that the oil pressure characteristic value for the friction engagement element may not be accurately calculated or estimated at the start of engagement thereof by the foregoing conventional oil pressure control device.

The present invention therefore seeks to provide an improved method for determining an oil pressure characteristic value by an automatic transmission system, by which the entire individual difference at the delivery initial condition can be absorbed.

SUMMARY OF THE INVENTION

According to an aspect of the present invention, an automatic transmission system includes an automatic transmission with a driving torque transmitting member, a torque converter with the driving torque transmitting member so as to transmit driving torque from a crankshaft to the automatic transmission in response to rotation of the driving torque transmitting member, plural friction engagement elements housed in the automatic transmission and engaged or disengaged for attaining plural shift stages, and a control unit for controlling an oil pressure to be supplied to the friction engagement elements and for controlling an engaging operation or a disengaging operation of the friction engagement elements based upon the controlled oil pressure supplied to the friction engagement elements, wherein one of the friction engagement elements is disengaged based upon the oil pressure controlled by the control unit, a side of the one of the friction engagement elements is transmitted with the rotation of the driving torque transmitting member, and the other side of the one of the friction engagement elements is locked not to be rotated during a vehicle at a stationary condition. The automatic transmission system further includes a rotational speed detecting means for detecting a variation of a rotation number of the driving torque transmitting member when the one of the friction engagement elements is controlled to be engaged. Therefore, an oil pressure characteristic value of the one of the friction engagement elements is learned by the control unit based upon the variation of the rotation number of the driving torque transmitting member when the one of the friction engagement elements is initially controlled to be engaged.

According to an aspect of the present invention, the oil pressure characteristic value is a pre-charge maximum time determined based upon the variation of the rotation number of the driving torque transmitting member while the oil pressure supplied to the one of the friction engagement elements is maintained at a predetermined oil pressure by the control unit.

According to another aspect of the present invention, the oil pressure characteristic value is a standby pressure determined based upon the variation of the rotation number of the driving torque transmitting member while the oil pressure to be supplied to the one of the friction engagement elements is gradually increased or gradually decreased by a predetermined step pressure every predetermined time by the control unit.

It is preferable that the one of the friction engagement elements is released from being engaged based upon the oil pressure controlled by the control unit when the variation of the rotation number of the driving torque transmitting member reaches a predetermined rotation number.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

An embodiment of the present invention will be described hereinbelow in detail with reference to the accompanying drawings.

Figure 1:
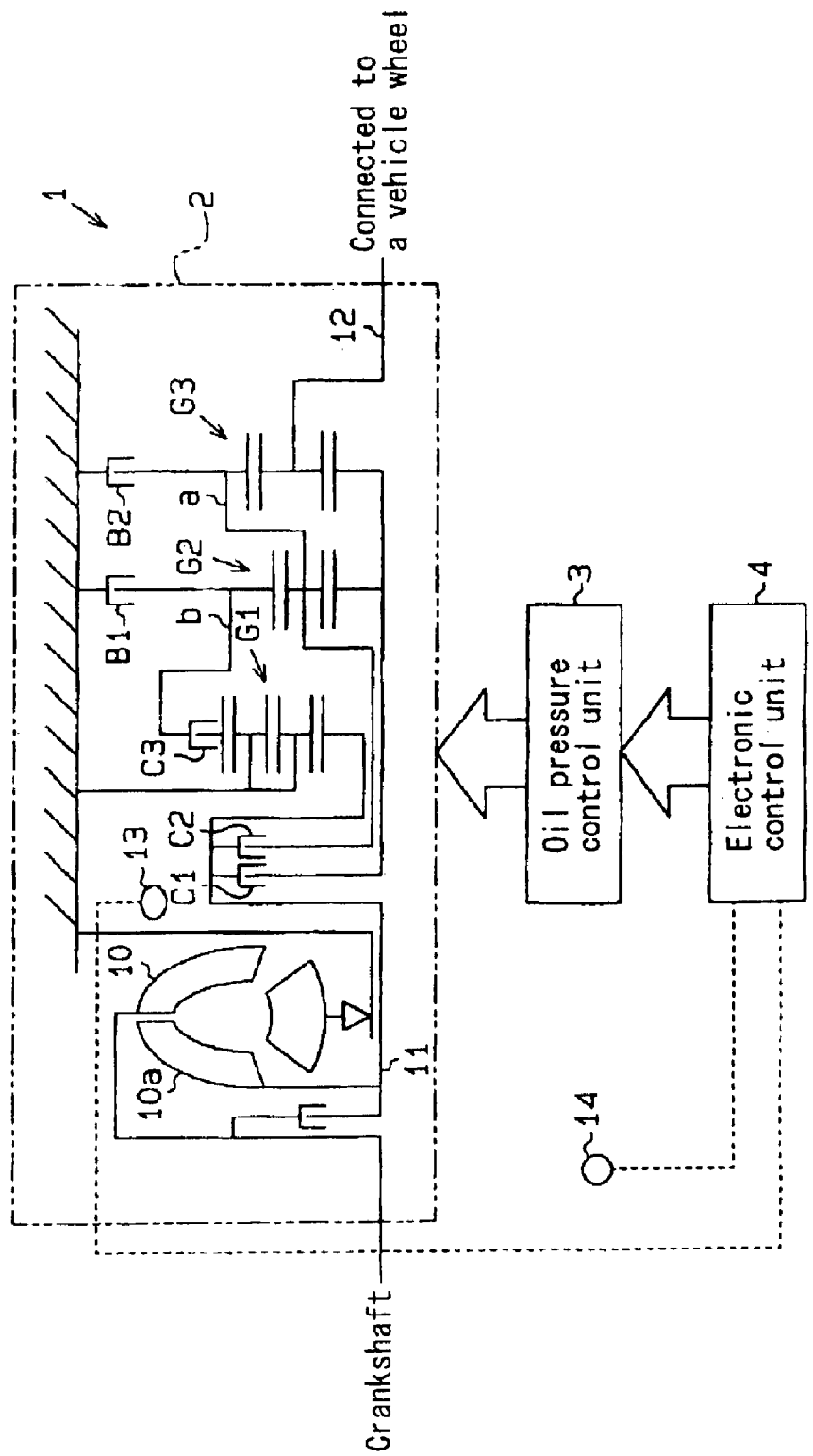
FIG. 1 is a block view schematically illustrating an entire structure of an automatic transmission system according to an embodiment of the present invention.

As especially seen in FIG. 1, an automatic transmission system 1 according to the embodiment of the present invention includes an automatic transmission 2, an oil pressure control unit 3, and an electronic control unit 4. The oil pressure control unit 3 and the electronic control unit 4 functions as a control unit.

The automatic transmission 2 is connected to a crankshaft of an engine (not shown) and transmits an engine torque to a vehicle wheel (not shown). The automatic transmission 2 is provided with a torque converter 10, which is connected to the crankshaft, a turbine 10a (i.e. a driving torque transmitting member), which is disposed in the torque converter 10 and is connected to an input shaft 11 of the automatic transmission 2, an output shaft 12, which is connected to the vehicle wheel via a differential gear (not shown), a first single pinion planetary gear set G1, which is connected to the input shaft 11, a second single pinion planetary gear set G2, and a third single pinion planetary gear set G3. The automatic transmission 2 further houses hydraulically-driven five friction engagement elements including a first friction clutch C1, a second friction clutch C2, a third friction clutch C3, a first friction brake B1, and a second friction brake B2. The five friction engagement elements are engaged or disengaged by the oil pressure control unit 3 and the electronic control unit 4 so that a selected shift stage is established in the automatic transmission 2 in accordance with the engagement or disengagement of the five friction engagement elements. The five friction engagement elements are engaged by being applied with a high pressure by the oil pressure control unit 3 and are disengaged by being applied with a low pressure thereby.

An oil pressure circuit in the oil pressure control unit 3 is switched by the electronic control unit 4, thereby capable of selecting the friction engagement element to be supplied with the oil pressure and controlling the supplied oil pressure.

The electronic control unit 4 is provided with a microcomputer (not shown) to which signals outputted from various sensors are inputted so that the oil pressure control unit 3 is activated based upon the inputted signals. The automatic transmission 2 according to the embodiment of the present invention is further provided with a sensor 13 (i.e. a rotational speed detecting means) for detecting a turbine rotation number Nt of the turbine 10a, i.e. for detecting a rotation number of the input shaft 11. The signal outputted from the sensor 13 is inputted into the electronic control unit 4. Further, a position sensor 14 is provided so as to detect a position of a selector lever (not shown) manually operated by a driver i.e. so as to detect an actually selected driving range (an R-range, an N-range, or a D-range). The signal outputted from the position sensor 14 is inputted into the electronic control unit 4. The R-range designates a reverse driving range, the N-range designates a neutral range, and the D-range designates a forward driving range.

TABLE 1

|  |  | C1 | C2 | C3 | B1 | B2 |
|---|---|---|---|---|---|---|
| R-range | Reverse shift stage |  |  | ○ |  | ○ |
| N-range | Neutral shift stage |  |  |  |  | ○ |
| D-range | Neutral shift stage |  |  |  | ( ) | ○ |
|  | 1st shift stage | ○ |  |  |  | ○ |
|  | 2nd shift stage | ○ |  |  | ○ |  |
|  | 3rd shift stage | ○ |  | ○ |  |  |
|  | 4th shift stage | ○ | ○ |  |  |  |
|  | 5th shift stage |  | ○ | ○ |  |  |
|  | 6th shift stage |  | ○ |  | ○ |  |
| RMKS |  | ○ |  |  | Engaged |  |
|  |  | Blank |  |  | Disengaged |  |

Table 1 explains a relationship between the friction engagement elements and a shift stage selected in accordance with the engaged or disengaged friction engagement elements. As explained by Table 1, the automatic transmission system 1 can establish six forward shift stages and a single reverse shift stage in the automatic transmission 2. The six forward shift stages include a neutral shift stage, under-drive shift stages such as 1st, 2nd, 3rd, and 4th shift stages, and over-drive shift stages such as 5th and 6th shift stages. That is, when the third friction clutch C3 and the second friction brake B2 are engaged respectively, the output shaft 11 is rotated in an opposite direction relative to a rotational direction of the input shaft 11 so as to move the vehicle in a rearward direction. When the only second friction brake B2 is engaged, the neutral shift stage is established in the automatic transmission 2. The 1st shift stage is established with the first friction clutch C1 and the second friction brake B2 engaged in the automatic transmission 2. The 2nd shift stage is established with the first friction clutch C1 and the first friction brake B1 engaged in the automatic transmission 2. The 3rd shift stage is established with the first and third friction clutches C1 and C3 in the automatic transmission 2. The 4th shift stage is established with the first and second friction clutches C1 and C2 engaged in the automatic transmission 2. The 5th shift stage is established with the second and third friction clutches C2 and C3 engaged in the automatic transmission 2. The 6th shift stage is established with the second friction clutch C2 and the first friction brake B1 engaged in the automatic transmission 2.

For example, when the 1st shift stage in the automatic transmission 2 is shifted to the 2nd shift stage, the second friction brake B2 is disengaged by the oil pressure control unit 3 activated by the electronic control unit 4 and the first friction brake B1 is engaged. When the 2nd shift stage in the automatic transmission 2 is shifted to the 3rd shift stage, the first friction brake B1 is disengaged and the third friction clutch C3 is engaged. When the 3rd shift stage is shifted to the 4th shift stage, the third friction clutch C3 is disengaged and the second friction clutch C2 is engaged. When the 4th shift stage is shifted to the 5th shift stage, the first friction clutch C1 is disengaged and the third friction clutch C3 is engaged. When the 5th shift stage is shifted to the 6th shift stage, the third friction clutch C3 is disengaged and the first friction brake B1 is engaged.

Further, as shown in Table 1, when the R-range is selected by the manually operated selector lever, the reverse shift stage is actually established in the automatic transmission 2. When the N-range is selected, the neutral shift stage is actually established in the automatic transmission 2. When the D-range is selected, any one of the neutral shift stage and the 1st through 6th shift stages is established in the automatic transmission 2.

Next, a method for determining the oil pressure characteristic value according to the embodiment of the present invention is described hereinbelow.

The microcomputer in the electronic control unit 4 houses a set program for learning the oil pressure characteristic value. Therefore, the oil pressure characteristic value is determined in response to startup of the set program. The set program is started up when the electronic control unit 4 is switched to a predetermined check mode. When the set program is started up, a fail safe function according to a normal shift operation control is cancelled. The electronic control unit 4 can establish a required oil pressure circuit in the oil pressure control unit 3 so as to learn the oil pressure characteristic value. The oil pressure characteristic value according to the embodiment of the present invention are a pre-charge maximum time, at which the amount of oil supplied to each friction engagement element is increased at an oil pressure supply initial stage so as to rapidly fill each friction engagement element with the oil, and a predetermined oil pressure (i.e. a standby pressure) determined immediately prior to the engagement of the friction engagement element.

The following description will be given for explaining the method for determining the oil pressure characteristic value for the third friction clutch C3. The set program is under a standby condition when the vehicle is under a stationary condition, the engine is under a startup condition, the N-range is selected by the manually operated selector lever, and the electronic control unit 4 is under the predetermined check mode. When the N-range is switched to the R-range in response to the manual operation of the selector lever from the standby condition, the electronic control unit 4 activates the oil pressure control unit 3 so as to engage the second friction brake B2. More particularly, the second friction brake B2 is under the engaged condition for establishing a neutral condition in the automatic transmission 2 during the N-range being selected by the driver. Therefore, the second friction brake B2 is just maintained at the engaged condition by the electronic control unit 4 when the N-range is switched to the R-range.

Figure 2:
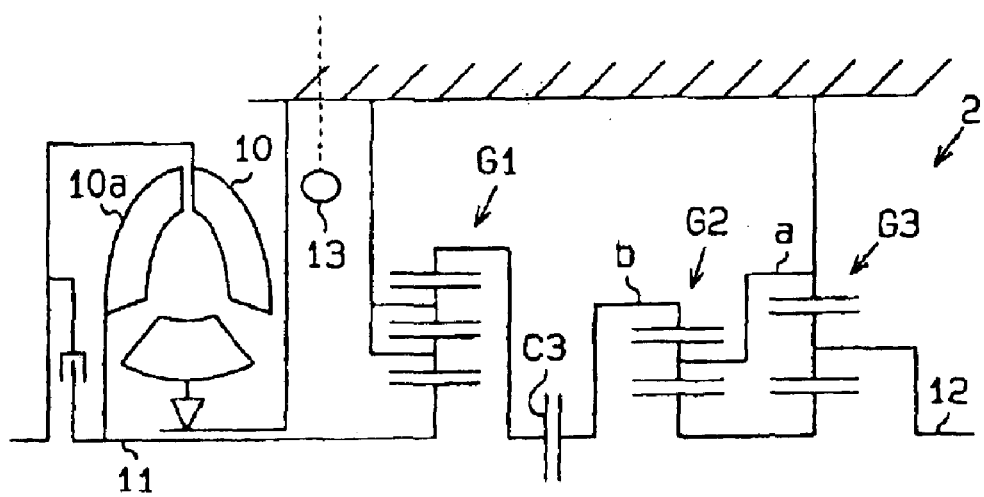
FIG. 2 is a schematic view illustrating a gear train in an automatic transmission when determining an oil pressure characteristic value according to the embodiment of the present invention.

FIG. 2 illustrates a gear train with the second friction brake B2 being engaged in the automatic transmission 2. The output shaft 12 connected to the vehicle wheel is locked not to be rotated by the vehicle wheel when the vehicle is under the stationary condition. A carrier a is hereby locked by the engaged second friction brake B2 and an output side (i.e. the other side) of the third friction clutch C3 is then locked as well, thereby the rotation number of the output side of the third friction clutch C3 is reduced to be zero. Meantime, the third friction clutch C3 is transmitted with the rotation of the input shaft 11, i.e. the rotation of the turbine 10a via the first single pinion planetary gear G1. Therefore, the rotation number of an input side (i.e. a side) of the third friction clutch C3 is expressed in accordance with $\rho1 \cdot Nt$, in which "$\rho1$" designates a gear ratio of the first single pinion planetary gear set G1.

In the automatic transmission 2 under the above-described condition, the third friction clutch C3 is applied with the oil pressure by the oil pressure control unit 3 activated by the electronic control unit 4 so as to be engaged. The input side of the third friction clutch C3 is engaged with the locked output side thereof in response to the oil pressure applied to the third friction clutch C3. The rotation number of the input side of the third friction clutch C3, i.e. the turbine rotation number Nt is then decreased. Therefore, the oil pressure characteristic value of the third friction clutch C3 under the initial engagement state is determined based upon a relationship between the control oil pressure, which is supplied to the third friction clutch C3 for engaging the input side of the third friction clutch C3 with the output side thereof, and the turbine rotation number Nt.

Figure 3:
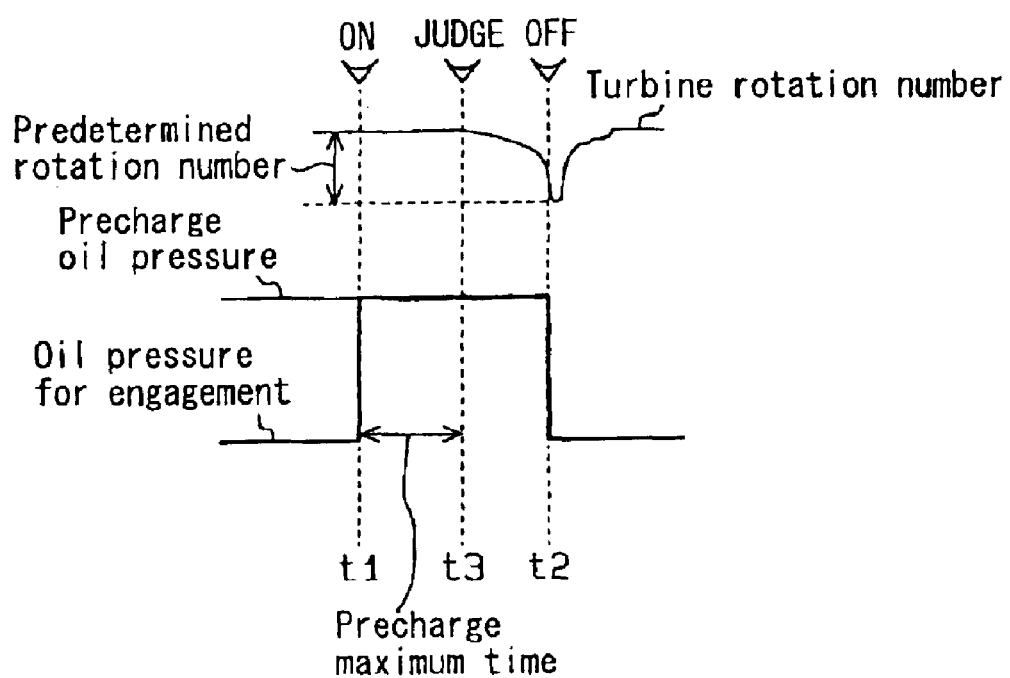
FIG. 3 is a time chart explaining a method for determining a pre-charge maximum time according to the embodiment of the present invention.

Referring to FIG. 3, the pre-charge maximum time, which is one of the oil pressure characteristic value, is determined in accordance with the set program. The electronic control unit 4 outputs a drive signal to the oil pressure control unit 3 so as to apply a predetermined pre-charge pressure (i.e. a predetermined oil pressure) to the third friction clutch C3 at a time t1, thereby the third friction clutch C3 is engaged. The third friction clutch C3 is continuously applied with the predetermined pre-charge pressure so as to be rapidly filled with the oil therein.

The torque converter 10 is shifted to a stall condition in response to the engagement of the third friction clutch C3 and the turbine rotation number Nt is reduced. The reduction of the turbine rotation number Nt is detected by the sensor 13. The electronic control unit 4 terminates outputting the drive signal for activating the oil pressure control unit 3 when diminution in the turbine rotation number Nt exceeds a predetermined rotation number at a time t2.

A start time of the diminution in the turbine rotation number Nt, i.e. an engagement start time t3 of the third friction clutch C3 is calculated by the electronic control unit 4 based upon a variation of the turbine rotation number Nt from the time t1 to the time t2. The time from the time t1 to the time t3 is learned as a pre-charge maximum time Tmax by the electronic control unit 4. The pre-charge maximum time Tmax is referred to for rapidly filling the third friction clutch C3 with the oil at the oil pressure supply initial stage.

Figure 4:
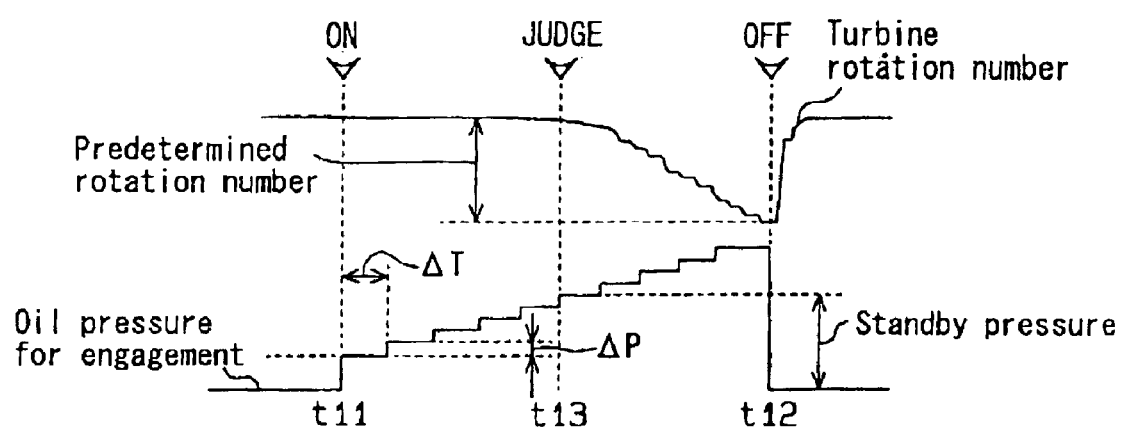
FIG. 4 is a time chart explaining a method for determining a standby pressure according to the embodiment of the present invention.

Referring to FIG. 4, the standby pressure, which is one of the oil pressure characteristic value, is determined in accordance with the set program. The electronic control unit 4 outputs a drive signal to the oil pressure control unit 3 so as to gradually increase the oil pressure applied to the third friction clutch C3 by a predetermined step-up oil pressure $\Delta P$ (i.e. a predetermined step pressure) every predetermined step-up time $\Delta t$ (i.e. every predetermined time) at a time t11. Therefore, the third friction clutch C3 is gradually filled in with the oil in proportion to an elapse of time.

The torque converter 10 is shifted to the stall condition when the oil pressure being applied to the third friction clutch C3 exceeds the predetermined oil pressure (i.e. the standby pressure). In this case, the turbine rotation number Nt is reduced. The reduction of the turbine rotation number Nt is detected by the sensor 13. The electronic control unit 4 terminates outputting the drive signal for activating the oil pressure control unit 3 when diminution in the turbine rotation number Nt exceeds a predetermined rotation number at a time t12.

A start time of the diminution in the turbine rotation number Nt, i.e. an engagement start time t13 of the third friction clutch C3 is calculated by the electronic control unit 4 based upon a variation of the turbine rotation number Nt from the time t11 to the time t12. The oil pressure being applied to the third friction clutch C3 at the time t13 is learned as a standby pressure Pmax. The standby pressure Pmax is referred to immediately prior to the engagement of the third friction clutch C3.

The following description will be given for explaining a method for determining the oil pressure characteristic value for the first friction clutch B1. The oil pressure characteristic value for the first friction clutch B1 is also determined based upon the above-described set program. The set program is under the standby condition when the vehicle is under the stationary condition, the engine is under the startup condition, the N-range is selected by the manually operated selector lever, and the electronic control unit 4 is under the predetermined test mode. When the N-range is switched to the D-range in response to the manual operation of the selector lever from the standby condition, the electronic control unit 4 activates the oil pressure control unit 3 for establishing the 6th shift stage in the automatic transmission 2 and for engaging the second friction clutch C2.

Figure 5:
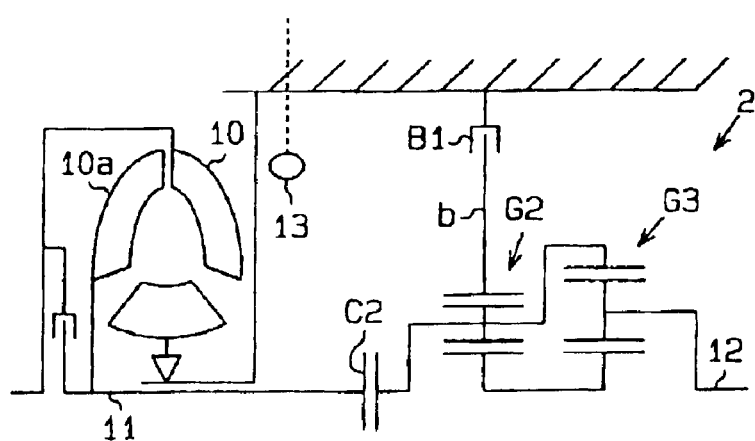
FIG. 5 is a schematic view illustrating the gear train in the automatic transmission when determining the oil pressure characteristic value according to the embodiment of the present invention.

FIG. 5 illustrates a gear train with the second friction clutch C2 being engaged in the automatic transmission 2. The output shaft 12 connected to the vehicle wheel is locked not to be rotated by the vehicle wheel when the vehicle is under the stationary condition. A side (i.e. a side) of a shaft b of the first friction brake B1 is transmitted with the rotation of the input shaft 11, i.e. the rotation of the turbine 10a via the first, second, and third single pinion planetary gear sets G1, G2, and G3. Therefore, the rotation number at the side of the shaft b of the first fiction brake B1 is expressed in accordance with $(1+\rho 2+\rho 2/\rho 3) \cdot Nt$. "$\rho 2$" and "$\rho 3$" designate gear ratio of the second and third single pinion planetary gear sets G2 and G3. The rotation number of a case side (i.e. the other side) of the first friction brake B1 is, needless to say, zero.

In the automatic transmission 2 under the above-described condition, the first friction brake B1 is applied with the oil pressure by the oil pressure control unit 3 activated by the electronic control unit 4 so as to be engaged. The side of the shaft b of the first friction brake B1 is engaged with the case side thereof in response to the engagement of the first friction brake B1. The rotation number of the side of the shaft b, i.e. the turbine rotation number Nt is then decreased. Therefore, the oil pressure characteristic value for the first friction brake B1 under the initial engagement state is determined based upon a relationship between the control oil pressure, which is supplied to the first friction brake B1 for engaging the side of the shaft b of the first friction brake B1 with the locked side of the first friction brake B1, and the turbine rotation number Nt. The method for determining the standby pressure, which is one of the oil pressure characteristic value, is the same as the method for determining the pre-charge maximum time. Therefore, the description of the method for determining the standby pressure will be omitted.

According to the embodiment of the present invention, the following effects can be obtained.

The oil pressure characteristic value for initially engaging the third friction clutch C3 is learned by the electronic control unit 4 and is calculated as an actual characteristic value entirely absorbing the individual differences of the automatic transmission system 1, the engine, the control unit (a drive circuit of the electronic control unit 4 and the oil pressure circuit of the oil pressure control unit 3), and the third friction clutch C3 (the piston stroke, a clearance, and a biasing force of a return spring). That is, the actual oil pressure characteristic value according to the embodiment of the present invention is approximately equivalent to a value representing the oil pressure characteristic for an actual shift operation. Therefore, the automatic transmission system 1 can be designed to possess a certain quality at the initial delivery state and the quality thereof can be effectively improved.

The oil pressure characteristic value for initially engaging the first friction brake B1 is learned by the electronic control unit 4 and is calculated as the actual characteristic value entirely absorbing the individual differences of the automatic transmission system 1, the engine, the control unit (a drive circuit of the electronic control unit 4 and the oil pressure circuit of the oil pressure control unit 3), and the third friction clutch C3 (the piston stroke, a clearance, and a biasing force of a return spring). That is, the oil pressure characteristic value. Therefore, the quality of the automatic transmission system 1 can be designed to possess a certain quality level at an initial delivery state and the quality thereof can be effectively improved.

The third friction clutch C3 and the first friction brake B1 are released from the engaged condition when the diminution in the turbine rotation number Nt detected by the sensor 13 reaches the predetermined rotation number. Therefore, the automatic transmission 2 can be effectively prevented from being maintained at the stall condition, in which the turbine 10 is not required to be rotated, even after the engagement operation of the third friction clutch C3 or the first brake B1.

The oil pressure characteristic value upon the initial engagement of each friction engagement element is not required to be determined by a vehicle drive test prior to delivery to a user. Therefore, fluctuation of the oil pressure characteristic value can be prevented. Further, the oil pressure characteristic value is determined when the vehicle is under the stationary condition so that the oil pressure characteristic value can be determined for a short period of time.

The oil pressure characteristic value upon the initial engagement of the third friction clutch C3 or the first fiction brake B1 is optimally determined according to the embodiment of the present invention. Therefore, a smoother and highly-responsive shift feeling can be attained. Further, the oil pressure characteristic value can be learned at an early stage after the vehicle delivered to an end user.

The present invention is not limited to the above-described preferred embodiment and can be modified.

The pre-charge maximum time for the third friction clutch C3 and the standby time therefore can be determined in a consecutive or separate manner. The pre-charge maximum time for the first friction brake B1 and the standby time therefore can be determined in a consecutive or separate manner.

The structure of the automatic transmission system 1 according to the embodiment of the present invention is not limited to the above-described preferred embodiment. The automatic transmission system 1 can possess any other structure.

The automatic transmission 2 according to the embodiment of the present invention establishes the six forward shift stages therein. Alternatively, the automatic transmission 2 can establish any other shift stages therein.

The oil pressure characteristic value according to the embodiment of the present invention is learned with reference to the turbine rotation number Nt. Alternatively, an engine rotation number can be adopted as an additional parameter to learn the oil pressure characteristic value. The engine rotation number actually corresponds to a rotation number of a pump (i.e. a driving torque transmitting member) which is disposed in the torque converter 10 and is connected to the crank shaft.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A method for controlling an automatic transmission, a torque converter with a driving torque transmitting member so as to transmit driving torque from a crankshaft to the automatic transmission in response to rotation of the driving torque transmitting member, plural friction engagement elements housed in the automatic transmission and engaged or disengaged for attaining plural shift stages, and a control unit for controlling an oil pressure to be supplied to the friction engagement elements and for controlling an engaging operation or a disengaging operation of the friction engagement elements based upon the controlled oil pressure supplied to the friction engagement elements, wherein one of the friction engagement elements is disengaged based upon the oil pressure controlled by the control unit, a side of the one of the friction engagement elements is transmitted with the rotation of the driving torque transmitting member, and the other side of the one of the friction engagement elements is locked not to be rotated while a vehicle is at a stationary condition, comprising:

detecting a variation of a rotation number of the driving torque transmitting member when the one of the friction engagement elements is controlled to be engaged and, learning an oil pressure characteristic value of the one of the friction engagement elements based upon the variation of the rotation number of the driving torque transmitting member when the other side of the one of the friction engagement elements is locked against rotation while the vehicle is at the stationary condition.

2. A method for controlling an automatic transmission according to claim 1, wherein the oil pressure characteristic value is a pre-charge maximum time determined based upon the variation of the rotation number of the driving torque transmitting member while the oil pressure supplied to the one of the friction engagement elements is maintained at a predetermined oil pressure by the control unit.

3. A method for controlling an automatic transmission according to claim 1, wherein the oil pressure characteristic value is a standby pressure determined based upon the variation of the rotation number of the driving torque transmitting member while the oil pressure to be supplied to the one of the friction engagement elements is gradually increased or gradually decreased by a predetermined step pressure every predetermined time by the control unit.

4. A method for controlling an automatic transmission according to claim 1, wherein the one of the friction engagement elements is released from being engaged based upon the oil pressure controlled by the control unit when the variation of the rotation number of the driving torque transmitting member reaches a predetermined rotation number.

5. A method for controlling an automatic transmission according to claim 2, wherein the one of the friction engagement elements is released from being engaged based upon the oil pressure controlled by the control unit when the variation of the rotation number of the driving torque transmitting member reaches a predetermined rotation number.

6. A method for controlling an automatic transmission according to claim 3, wherein the one of the friction engagement elements is released from being engaged based upon the oil pressure controlled by the control unit when the variation of the rotation number of the driving torque transmitting member reaches a predetermined rotation number.

7. A method for controlling an automatic transmission according to claim 1, wherein the oil pressure characteristic value is learned by the control unit when the driving torque from the crankshaft is transmitted to the automatic transmission.

8. A method for controlling an automatic transmission according to claim 1, wherein the oil pressure characteristic value is a pre-charge maximum time or a standby pressure, and the pre-charge maximum time and the standby pressure are determined consecutively or separately.

9. A method for controlling an automatic transmission according to claim 1, wherein the driving torque transmitting member includes a turbine housed in the torque converter, a pump housed in the torque converter, or an input shaft of the automatic transmission.

10. A method for controlling an automatic transmission according to claim 9, wherein the rotational speed detecting means is a sensor for detecting a variation of a rotational number of the turbine, and the rotational number of the turbine corresponds to a rotational number of the input shaft of the automatic transmission.

11. An automatic transmission system for a vehicle, comprising:

an automatic transmission;

a torque converter with a driving torque transmitting member so as to transmit driving torque from a crankshaft to the automatic transmission in response to rotation of the driving torque transmitting member;

plural friction engagement elements housed in the automatic transmission and engaged or disengaged for attaining plural shift stages;

a control unit for controlling an oil pressure to be supplied to the friction engagement elements and for controlling an engaging operation or a disengaging operation of the friction engagement elements based upon the controlled oil pressure supplied to the friction engagement elements; and a rotational speed detecting means for detecting a variation of a rotation number of the driving torque transmitting member when one of the friction engagement elements, which has been disengaged based upon the oil pressure controlled by the control unit, a side of which has been transmitted with the rotation of the driving torque transmitting member, and the other side of which is locked not to be rotated while the vehicle is at a stationary condition, is controlled to be engaged, wherein an oil pressure characteristic value of the one of the friction engagement elements is learned by the control unit based upon the variation of the rotation number of the driving torque transmitting member when the other side of the one of the friction engagement elements is locked against rotation while the vehicle is at the stationary condition.

12. An automatic transmission system for a vehicle according to claim 11, wherein the oil pressure characteristic value is a pre-charge maximum time determined based upon the variation of the rotation number of the driving torque transmitting member while the oil pressure supplied to the one of the friction engagement elements is maintained at a predetermined oil pressure by the control unit.

13. An automatic transmission system for a vehicle according to claim 11, wherein the oil pressure characteristic value is a standby pressure determined based upon the variation of the rotation number of the driving torque transmitting member while the oil pressure to be supplied to the one of the friction engagement elements is gradually increased or gradually decreased by a predetermined step pressure every predetermined time by the control unit.

14. An automatic transmission system for a vehicle according to claim 11, wherein the one of the friction engagement elements is released from being engaged based upon the oil pressure controlled by the control unit when the variation of the rotation number of the driving torque transmitting member reaches a predetermined rotation number.

15. An automatic transmission system for a vehicle according to claim 12, wherein the one of the friction engagement elements is released from being engaged based upon the oil pressure controlled by the control unit when the variation of the rotation number of the driving torque transmitting member reaches a predetermined rotation number.

16. An automatic transmission system for a vehicle according to claim 13, wherein the one of the friction engagement elements is released from being engaged based upon the oil pressure controlled by the control unit when the variation of the rotation number of the driving torque transmitting member reaches a predetermined rotation number.

17. An automatic transmission system for a vehicle according to claim 11, wherein the oil pressure characteristic value is learned by the control unit when the driving torque from the crankshaft is transmitted to the automatic transmission.

18. An automatic transmission system for a vehicle according to claim 11, wherein the oil pressure characteristic value is a pre-charge maximum time or a standby pressure, and the pre-charge maximum time and the standby pressure are determined consecutively or separately.

19. An automatic transmission system for a vehicle according to claim 11, wherein the driving torque transmitting member includes a turbine housed in the torque converter, a pump housed in the torque converter, or an input shaft of the automatic transmission.

20. An automatic transmission system for a vehicle according to claim 19, wherein the rotational speed detecting means is a sensor for detecting a variation of a rotational number of the turbine, and the rotational number of the turbine corresponds to a rotational number of the input shaft of the automatic transmission.

* * * * *